April 15, 1947. E. C. READ 2,418,901
CROSS HEAD AND GUIDE STRUCTURE
Filed April 1, 1943
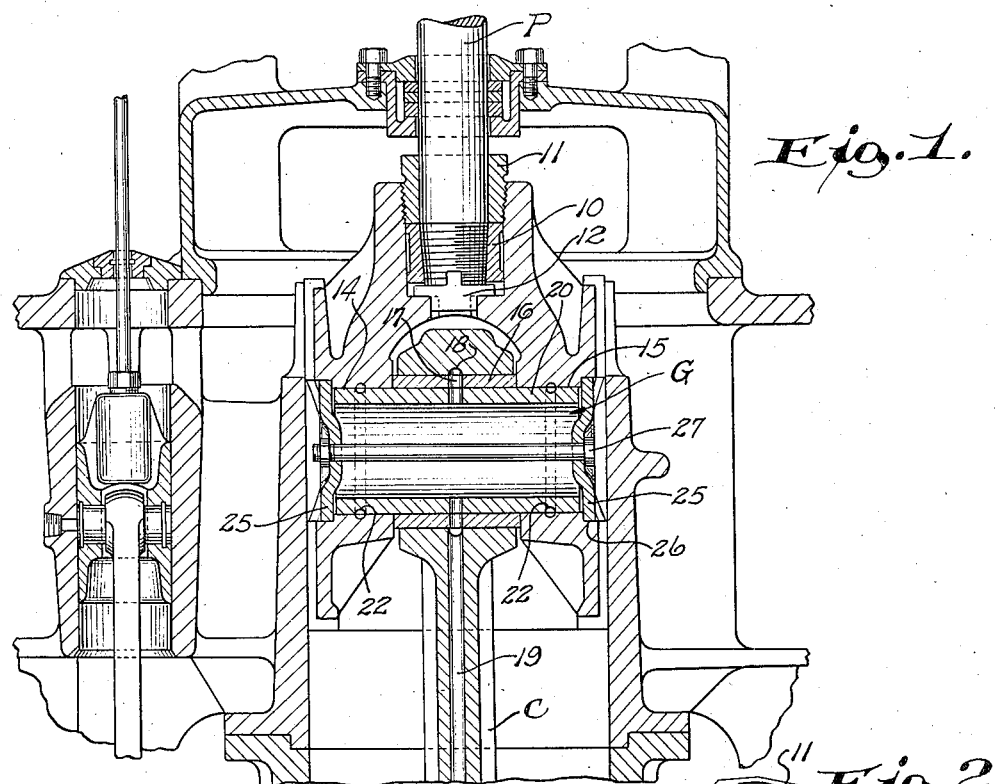
Fig. 1.
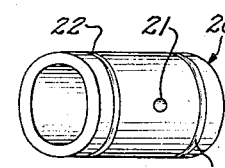
Fig. 5.
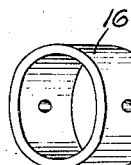
Fig. 4.
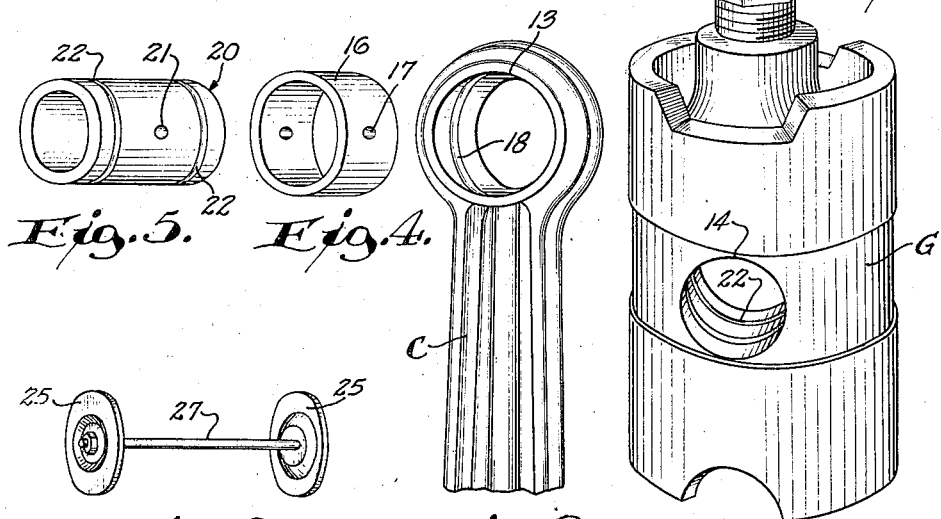
Fig. 2.
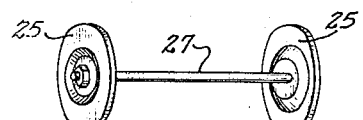
Fig. 6.
Fig. 3.
INVENTOR.
EVERETT C. READ.
BY John W. Michael
ATTORNEY.

Patented Apr. 15, 1947

2,418,901

UNITED STATES PATENT OFFICE 2,418,901

CROSSHEAD AND GUIDE STRUCTURE

Everett C. Read, Milwaukee, Wis., assignor to The Filer & Stowell Co., Milwaukee, Wis., a corporation of Wisconsin Application April 1, 1943, Serial No. 481,437

3 Claims. (Cl. 184—6)

This invention relates in general to steam engines, and more particularly to an improvement in the cross head and guide structure for operative interconnecting the piston rod of such an engine to the connecting rod thereof.

The present application is a continuation-in-part of my application for "Steam engines," filed June 3, 1942, Ser. No. 445,619, which in turn is a division of an application filed by me on February 3, 1937, for "Steam engines," and now U. S. Patent 2,300,747, granted November 3, 1942.

The object of the present invention is to provide a cross head and guide structure, which operatively interconnects the piston and connecting rod in such an advantageous way that the elements that serve to transmit the motion will not only be highly effective in their action, but will accomplish their function with a minimum of friction and consequent reduction in wear and tear on the parts. The structural organization is such that the relatively movable parts, serving to interconnect the piston and connecting rod, work against oil films, metal-to-metal contact being avoided, and the lubricant being utilized to absorb the friction although, of course, the stresses incident to the transmission of motion are taken and absorbed by the metallic elements of the structure.

Another object of the invention is to provide a cross head and guide structure of this character, which is simple and compact in construction, closely organized, and readily and easily assembled and disassembled.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a fragmentary view in central, vertical, longitudinal cross section, showing a portion of the steam engine having a cross head and guide structure embodying the present invention;

Figure 2 is a detail perspective view of the cross head;

Figure 3 is a fragmentary view in perspective illustrating the construction of the upper end of the connecting rod;

Figure 4 is a detail perspective view of the bushing which interfits with the bearing at the upper end of the cross head;

Figure 5 is a detail view in perspective of the tubular or hollow wrist pin; and Figure 6 is a detail view in perspective showing the discs and their connecting nut and bolt which hold the wrist pin against axial displacement.

Referring to the drawing, it will be seen that the steam engine there partially illustrated includes a piston rod P reciprocated in the usual manner and transmitting its drive to a connecting rod C by means of a cross head and a guide structure designated as a whole at G.

The lower end of the piston rod is releasably interconnected with the upper end of the cross head G.

The releasable connection between the lower end of the piston rod P and the cross head G comprises a collar 10 having an internally tapered and threaded opening or bore which is threadedly engaged with the correspondingly formed and machined lower end of the piston rod P. In this way the collar 10 is fixed to the lower end of the piston rod and properly positioned thereon. The collar 10 may be fixed in other ways to the piston rod, but the structure described is advantageous from the point of view of assembly. A sleeve nut 11 is loosely mounted on the piston rod P above the collar 10. The sleeve nut 11 is externally threaded and has its external threads threadedly engaged with internal threads machined on the inner peripheral wall of the socket of the cross head. The lower end of the sleeve nut 11 engages and presses downwardly on the upper end of the collar 10.

A combined locating and distance block and double-key 12 is interposed between and interfitted with the lower end of the piston rod and the floor of the socket of the cross head. This feature of the construction, in connection with its organization of the steam engine, per se, forms no part of the present invention as it is described and claimed in my application for "Steam engines," filed June 3, 1942. Ser. No. 445,619.

To interconnect the connecting rod C with the cross head G the connecting rod is provided at its upper end with a suitably machined bearing 13.

In the assembly the upper end of the connecting rod C is disposed within the confines of the cross head G, and has its bearing 13 coaxially disposed with respect to diametrically opposite bearings 14 and 15 provided in the cross head.

A floating bushing 16 is fitted in the connecting rod bearing 13. The bushing 16 is provided with a suitable number of oil passages 17 which are in open communication with an annular groove 18 provided in the inner surface of the connecting rod bearing 13. Oil under pressure is supplied to the groove 18 through an oil duct or passage 19 which extends axially through the connecting rod. The oil flows through the passage 19 and passes from the annular groove 18 through the openings 17 of the bushing 16 so as to lubricate both sides of the bushing 16, namely the surface thereof that contacts the bearing surface 13 of the connecting rod C and also the inner surface of the bushing 16 in bearing contact with the tubular wrist pin now to be described.

The wrist pin referred to is designated at 20 and is of hollow or tubular construction, and is utilized to operatively interconnect the connecting rod to the cross head G. The central portion of this wrist pin is interfitted with the floating bushing 16 for rotation relative thereto. The ends of the wrist pin project beyond the bushing 16 and are interfitted with the cross head bearings for rotation relative thereto. The central portion of the floating wrist pin is provided with one or more oil passages 21 which are in same plane with the oil passages 17 of the floating bushing 16 so that oil is transferred from the passages 17 of the floating bushing to the passages 21 of the floating wrist pin, and this in such a way that the outer peripheral surface of the floating wrist pin is lubricated. The end portions of the floating wrist pin 20, interfitted with the cross head bearings for rotation relative thereto, are provided with oil distributing channels 22. Obviously passages 17 and 21 do not always remain in the position shown in Fig. 1 during normal operation, but this does not in any wise impair their capacity for efficient functioning.

To hold the parts assembled, and to constrain the floating wrist pin 20 against axial displacement, a pair of retaining discs 25 are provided, one at each end of the floating wrist pin. Each retaining disc 25 is accommodated in a recess 26 provided therefor in the cross head and bears against the shoulder presented by the inner wall of the recess. The primary function of the discs 25 is to close the outer ends of the connecting rod bearings. At the same time they are engageable with the ends of the wrist pin to limit its axial movement but their contact must not be such as to interfere with the floating action and also with the seepage of oil around the outer ends of the wrist pin and inwardly along the portions of the outer surfaces of the wrist pin which are in engagement with the cross head bearings. A bolt and nut 27 interconnects the discs 25 and ties them together so that they are operative to maintain the parts in operative assembly.

As described and shown in the drawings, the oil is supplied under pressure through the passage 19 to the annular groove 18. In the assembly the annular groove 18 surrounds the floating bushing 16 and in such form and with the pressure supply of the oil will establish a film of oil in the clearance that is provided between the bearing surface 13 of the connecting rod and the outer peripheral surface of the floating bushing 16. Thus oil in the film as well as the oil in the groove being maintained under pressure will find its way to the number of passages 17 and will pass through them. The performance described is now again repeated since the oil flowing through the passages 17 will next establish an oil film in the clearance that exists between the inner peripheral surface of the bushing 16 and the outer peripheral surface of the floating wrist pin 20. This oil film extends to and feeds the oil distributing the channels 22 in the end portions of the floating wrist pin 20. In addition, the oil finds its way through the passages 21 into the interior of the floating wrist pin 20 and flows to both ends of this floating wrist pin, and some seeps around the ends of the floating wrist pin and back on to the outer peripheral surface thereof.

By having a floating wrist pin and a floating bushing construction organized in the manner described, an operative interconnection is provided between the piston rod and the connecting rod so that the motion is advantageously transmitted between these parts. And this is accomplished while maintaining an oil film between both the floating bushing and the connecting rod, between the floating wrist pin and the bushing, and between the ends of the wrist pin and the cross head bearing. Consequently, wear is decreased, and the wrist pin 20, connecting rod C, bushing 16, and connecting rod bearings 14 and 15 stay round.

While I have shown and described one construction in which the invention may be advantageously embodied, it is to be understood that the construction shown has been selected merely for the purpose of illustration or example, and that various changes in the size, shape, and arrangement of parts may be made without departing from the spirit of the invention or the scope of the subjoined claims.

I claim:

1. A device of the character described comprising a cross head having diametrically opposite bearings, a connecting rod having its upper end disposed within the confines of the cross head and provided with a bearing coaxial with the bearings of the cross head, a floating bushing fitted in the connecting rod bearing with clearance and provided with radial oil distributing passages, said connecting rod having a longitudinal oil supply passage terminating in an annular groove registering with the radial oil distributing passages of the floating bushing, the clearance between the bearing surface of the connecting rod and the outer peripheral surface of the floating bushing providing for lubrication of said surfaces, a floating wrist pin of tubular construction having its intermediate portion rotatably fitted in the floating bushing and having its ends projecting beyond the bushing and rotatably fitted in the cross head bearings, said floating wrist pin also having radial oil passages therein to provide for flow of oil to the clearance space between the outer surface of the intermediate portion of the wrist pin and the inner peripheral surface of the floating bushing and also to provide for the flow of oil to the interior of the floating wrist pin, and means coacting with the ends of the floating wrist pin with clearance and bearing against the cross head to close the outer ends of the cross head bearings and limit axial movement of the floating wrist pin, the clearance between the ends of the wrist pin and said means allowing seepage of oil from the interior of the floating wrist pin to the clearance between the outer periphery surfaces of these end portions of the floating wrist pin and the cross head bearings.

2. A device of the character described comprising a cross head having diametrically opposite bearings, a connecting rod having its upper end disposed within the confines of the cross head and provided with a bearing coaxial with the bearings of the cross head, a floating bushing fitted in the connecting rod bearing and provided with radial oil distributing passages, said connecting rod having a longitudinal oil supply passage terminating in an annular groove registering with the radial oil distributing passages of the floating bushing, the clearance between the bearing surface of the connecting rod and the outer peripheral surface of the floating bushing providing for lubrication of said surfaces, a floating wrist pin of tubular construction having its intermediate portion rotatably fitted in the floating bushing and having its ends projecting beyond the bushing and rotatably fitted in the cross head bearings, said floating wrist pin also having radial oil passages therein to provide for flow of oil to the clearance space between the outer surface of the intermediate portion of the wrist pin and the inner peripheral surface of the floating bushing and also to provide for the flow of oil to the interior of the floating wrist pin, means coacting with the ends of the floating wrist pin and bearing against the cross head to close the outer ends of the cross head bearings and limit axial movement of the floating wrist pin and said means allowing seepage of oil from the interior of the floating wrist pin to the clearance between the outer peripheral surfaces of these end portions of the floating wrist pin and the cross head bearings, the portions of the floating wrist pin engaged with the cross head bearings having annular oil distributing passages in open communication with the bearing surfaces of the cross head.

3. A device of the character described comprising a cross head having diametrically opposite bearings and having recesses therein presenting outwardly facing shoulders, a connecting rod having its upper end disposed within the confines of the cross head and provided with a bearing coaxial with the bearings of the cross head, a floating bushing fitted in the connecting rod bearing and provided with radial oil distributing passages, said connecting rod having a longitudinal oil supply passage terminating in an annular groove registering with the radial oil distributing passages of the floating bushing, the clearance between the bearing surface of the connecting rod and the outer peripheral surface of the floating bushing providing for lubrication of said surfaces, a floating wrist pin of tubular construction having its intermediate portion rotatably fitted in the floating bushing and having its ends projecting beyond the bushing and rotatably fitted in the cross head bearings, said floating wrist pin also having radial oil passages therein to provide for oil flow to the clearance space between the outer surface of the intermediate portion of the wrist pin and the inner peripheral surface of the floating bushing and also to provide for the flow of oil to the interior of the floating wrist pin, a pair of discs having their margins engaged with said cross head shoulders to close the outer ends of the cross head bearings and being in closely adjacent relation to the ends of the wrist pin to limit axial movement thereof while allowing seepage of oil from the interior of the wrist pin to the clearances between the outer peripheral surface of the end portions of the wrist pin and the cross head bearings, and means coacting with the discs to fasten them in position.

EVERETT C. READ.

REFERENCES CITED

The following references are of record in the file of this patent:

UNITED STATES PATENTS

| Number | Name | Date |
| --- | --- | --- |
| 2,149,097 | Paton | Feb. 22, 1939 |
| 2,037,209 | Buckwalter | Apr. 14, 1936 |
| 2,013,962 | Hutchens | Sept. 10, 1935 |
| 1,922,707 | Newcomb | Aug. 15, 1933 |
| 1,923,717 | Frelin | Aug. 22, 1933 |
| 1,777,340 | Wallden | Oct. 7, 1930 |
| 2,043,014 | Shoemaker | June 2, 1936 |
| 1,562,644 | Jones | Nov. 24, 1925 |
| 1,995,548 | Mermigis | Mar. 26, 1935 |
| 2,126,388 | Hoke | Aug. 8, 1938 |
| 292,994 | Darling | Feb. 5, 1884 |
| 2,194,710 | Metzgar | Mar. 26, 1940 |
| 15,817 | Riley | Sept. 30, 1856 |
| 2,239,875 | Buckwalter | Apr. 29, 1941 |